US005992032A

United States Patent [19]

Chiang et al.

[11] Patent Number: 5,992,032

[45] Date of Patent: Nov. 30, 1999

[54] METHOD AND APPARATUS FOR INCLINATION MEASUREMENT USING PIEZOELECTRIC EFFECT

[75] Inventors: Chung-I Chiang, Tao-Yuan; Chih-Wen Hsieh; Long-Jang Hu, both of Taipei; Ming-Shing Jou, Tao-Yuan; Shun-Lih Tu; Horng Chang, both of Taipei, all of Taiwan

[73] Assignee: Chung-Shan Institute of Science & Technology, Tao-Yuan, Taiwan

[21] Appl. No.: 08/804,541

[22] Filed: Feb. 24, 1997

[51] Int. Cl.[6] .......... G01C 9/06

[52] U.S. Cl. .......... 33/366.11; 33/366.25; 33/365

[58] Field of Search .......... 33/366.11, 366.12, 33/366.13, 366.24, 366.25, 366.26, 366.27, 1 N, 365; 310/321, 329; 73/382 R

[56] References Cited

U.S. PATENT DOCUMENTS

| | | | |
|---|---|---|---|
| 3,736,446 | 5/1973 | Berlincourt et al. | 310/359 |
| 4,660,941 | 4/1987 | Hattori et al. | 359/224 |
| 4,843,887 | 7/1989 | Engeler et al. | 73/730 |
| 4,912,662 | 3/1990 | Butler et al. | 702/154 |
| 4,942,668 | 7/1990 | Franklin et al. | 33/366.14 |
| 4,993,162 | 2/1991 | Scholian | 33/366.16 |
| 5,034,649 | 7/1991 | Chida et al. | 310/332 |
| 5,170,567 | 12/1992 | David et al. | 33/366.13 |
| 5,170,665 | 12/1992 | Janiaud et al. | 73/514.16 |
| 5,237,753 | 8/1993 | Carlson et al. | 33/366.14 |
| 5,365,671 | 11/1994 | Yaniger | 33/366.12 |
| 5,371,951 | 12/1994 | Piske | 33/366.12 |

*Primary Examiner*—Diego Gutierrez
*Assistant Examiner*—Richard A. Smith
*Attorney, Agent, or Firm*—Merchant & Gould P.C.

[57] ABSTRACT

An apparatus using piezoelectric effect is provided for measuring an angle between a reference plane and a plane to be measured. Such an apparatus can be used to measure the inclination of a plane or for leveling purpose. The main characteristics of the apparatus are simple in structure, no limitation in the measurement range, and less limitation to the environment. The apparatus also has the following advantages: compact, quick and accurate measurement, easy for multiaxial measurement.

6 Claims, 5 Drawing Sheets

METHOD AND APPARATUS FOR INCLINATION MEASUREMENT USING PIEZOELECTRIC EFFECT

FIELD OF THE INVENTION

The present invention relates to an apparatus for measuring an inclination angle of a plane with respect to a reference plane by the use of a piezoelectric sensing unit.

BACKGROUND OF THE INVENTION

Inclination measurement is used to determine an inclination of a plane with respect to a known reference plane or a reference coordinate. Leveling is an inclination measurement method with the reference plane perpendicular to the earth's gravitational field, i.e., the horizontal plane. Such a quick and accurate method for measuring an inclination of a machine or an instrument is widely used among the low-cost consumers such as carpenters, and in large industries.

Most of the known inventions for inclination measurement are similar to a balance. When the balance is placed at different inclined planes, the angular difference of the equilibrium positions of the balance's arm under the gravity is the basis for measurement. It can be further classified as follows: (1) measurement of the position of a gas-liquid interface. The liquid acts as a balance's arm, and the gas-liquid interface acts as an indicator. Traditionally, the position of the interface is measured by naked eyes. Either optical reflection from the interface or a capacitance method is adopted in recent inventions. (2) measurement of the relative position of a fixed arm/plate and a mobile arm/plate. The indicator of the mobile arm is parallel to the gravitational field, and the fixed arm is parallel to the outer case of the inclinometer, i.e., parallel to the plane to be measured. The angle between the arms is measured directly by a mechanical means with linkage mechanism, or indirectly by means of capacitance change or optical path change.

The U.S. patents related to the inclination measurement having the above discussed principles are: Butler U.S. Pat. No. 4,912,662, Franklin U.S. Pat. No. 4,942,668, Scholian U.S. Pat. No. 4,993,162, Davis U.S. Pat. No. 5,170,567, Carlson U.S. Pat. No. 5,237,753, Yaniger U.S. Pat. No. 5,365,671, and Piske U.S. Pat. No. 5,371,951.

There are three major disadvantages in the conventional methods. First, the measuring range of the inclination is usually limited to ±45°, because the measuring arm is usually supported in the middle as a balance. Theoretically, the arm at a ±45° position is a metastable point. Thus, an accurate measurement near ±45° is difficult. Although by using an additional set of sensing unit parallel to the gravitational field, i.e., perpendicular to the original arm for measuring a higher angle can solve this problem partly, the inclinometer is either less accurate in measurement or complicated in structure. It is also difficult for overhead measurement. Second, fluid is used either directly as an arm, for increasing the differences in dielectric constant for capacitance measurement, or for increasing the differences in reflection index when measuring the optical path. The conventional methods limit the inclinometer to be used in a certain environment, and the inclinometer is not suitable to use at a high(low) temperature, at an overhead position or in vacuum. Third, only the inclined angle along one axis which is usually the balance's arm can be obtained by each measurement. The so-called multiaxial measurement cannot be performed directly.

It should be indicated that a piezoelectric resonator to transform and magnify the input signal via electromechanical coupling between the input end and the output end is disclosed in the patents, for example, U.S. Pat. No. 3,736,446. But the reference does not teach to use a piezoelectric resonator as an inclinometer to measure an inclined angle by measuring the vibrating amplitude as disclosed in the present invention.

The use of piezoelectric actuators for changing the angular position of a tilting mirror of a light deflection apparatus has been described in U.S. Pat. No. 4,660,941. But the angular position of the mirror plane in the reference is measured by a capacitance method, which is different from the present invention.

In U.S. Pat. No. 4,843,887, a piezoelectric sensor is used as a strain gauge. A signal induced by the piezoelectric sensor under an applied stress is transformed into a strain value. The present invention uses the induced signal of a piezoelectric body under applied gravitational force to obtain a plane inclination. Accordingly, it is different from the reference.

SUMMARY OF THE INVENTION

The present invention is capable of a multiaxial measurement and has a wide measurement range. No fluid is required by the use of a piezoelectric sensing unit. Further, the present invention provides a simple, inexpensive and compact unit for inclination measurement.

The present invention uses an electric signal induced via the piezoelectric effect of a piezoelectric body under the gravitational force of a weight. The piezoelectric body is parallel to a plane to be measured. Both the magnitude and the direction of the gravitational force of the weight are constant. The component force of the gravity applied on the piezoelectric body is varied depending on the plane to be measured. The angle between the gravitational force and the vibration direction of the piezoelectric body can be obtained by measuring the magnitude of the component force and by using the simple geometric relations between them. If an arbitrary plane is selected as a reference plane, the angle between the plane to be measured and the reference plane is equal to the differential angle of the planes with respect to the gravity.

DETAILED DESCRIPTION OF THE INVENTION AND PREFERRED EMBODIMENTS

Figure 1A:
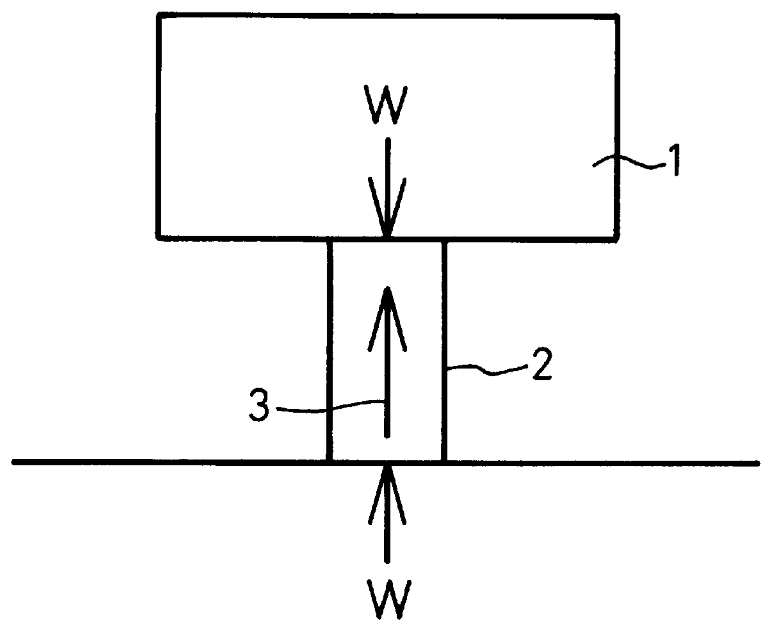
FIGS. 1A and 1B schematically show a basic sensing unit for inclination measurement. The sensing unit is placed on a reference plane as shown in 1A, and on a plane to be measured as shown in 1B.
Figure 1B:
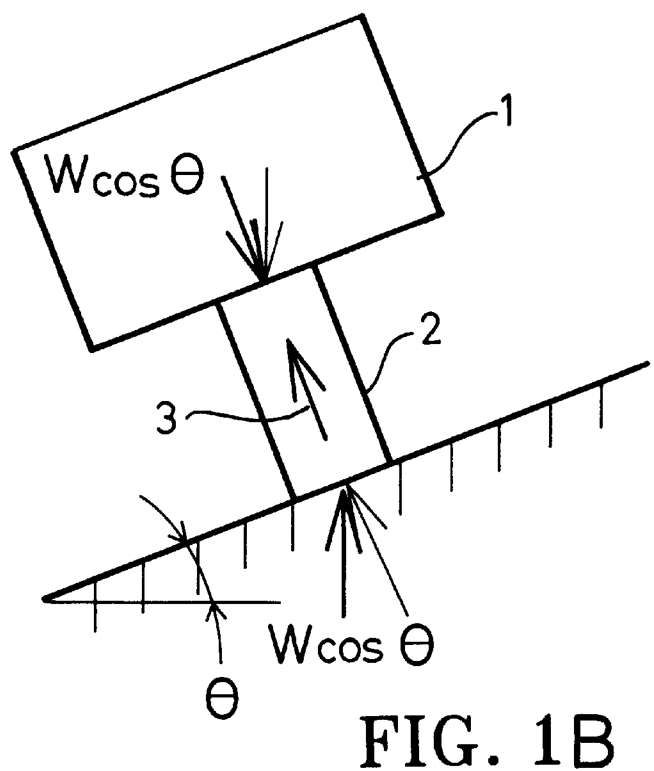

The invention uses a weight 1 on top of a piezoelectric body 2. The direction of polarization 3 is along the longitudinal direction of the piezoelectric body 2, as shown in FIG. 1A. Surface charges are induced to the long ends of the piezoelectric body 2 by the action of the gravitational force of the weight 1. If the piezoelectric body 2 is placed on a horizontal plane, the force along the direction of polarization 3 is W, and the amount of the induced charges is proportional to W. If the piezoelectric body 2 is placed on an inclined plane with an angle $\theta$, the force along the direction of polarization 3 is reduced to W cos $\theta$, and the induced charges are decreased accordingly, as shown in FIG. 1B. In most applications, the inclined angle is small, thus the effect of the shear force caused by the weight 1 can be ignored. For higher degree of inclination, the effect of the shear force should be included. Nevertheless, there is a definite relation between the amount of the induced charges and the inclined angles. An inclined angle can be obtained when a calibration curve is obtained according to the above mentioned relations. The situation turns to be two-dimensional if the length and width of the piezoelectric body 2 and the corresponding weight 1 are much larger than the depth. Thus, the inclined angle is the angle between a plane to be measured and a horizontal plane which are on a plane defined by the length and width of the piezoelectric body or weight. If three such sensing units located 120° apart from each other are used, all the three angles along an orthogonal coordinate can be obtained.

No fluid is required in the present invention. There is no limitation to the measurement range. The effect of environment on the inclinometer is less because of the nature of the ceramic piezoelectric material. The piezoelectric material is also cheap and can be manufatured into compact form easily.

There are two major considerations to this embodiment. First, measurement of the surface charges requires a complicate and expensive electronics. Second, the sensing unit suffers the equilibrium and fatigue problems because of the direct contact of the weight 1 and the piezoelectric body 2. In view of the above, an inclinometer with two modifications is embodied as follows:

(1) Dynamic inclination measurement method

The first problem is solved by using a piezoelectric resonator instead of a static piezoelectric body. A piezoelectric resonator is a piezoelectric plate formed substantially of two parts. A first part has a polarization that acts in the thickness direction, which is called the input end; and a second part has a polarization that acts in the longitudinal direction, which is called the output end. A longitudinal vibration under resonance is excited in the plate by an AC input signal at the input end, and an AC output signal is obtained at the output end via an electromechanical coupling of the two parts. The ratio of the output amplitude to the input amplitude is proportional to the ratio of the length-to thickness of the resonator. If the manitude of the input signal is fixed and a force is applied along the direction of the vibration at the end, the amplitude of the output signal will reduce as the force increasing. Thus, the amplitude of the output signal can be used to determine the force acted along the direction of the vibration. Since the force in the invention is the component force of the gravity of the attached weight, i.e. W cos $\theta$, its magnitude can be determined by the amplitude of the output signal. The angle of the longitudinal direction of the piezoelectric resonator with respect to the gravity is equal to the inverse cosine of the ratio (W cos $\theta$/W).

(2) Cantilever inclination measurement method

Figure 2A:
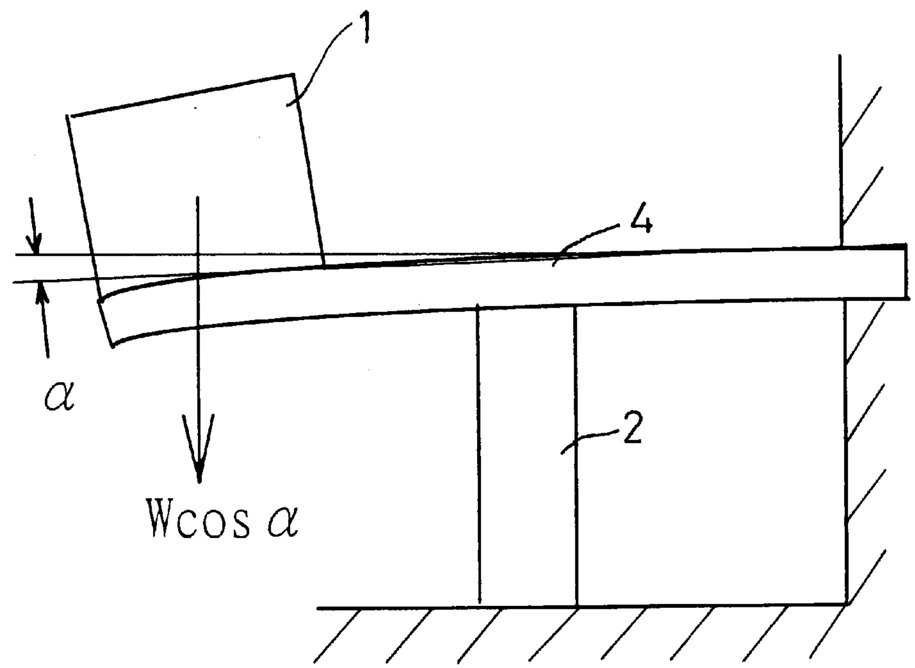
FIGS. 2A and 2B show the use of a cantilever according to one embodiment of the present invention. The sensing unit is placed on a reference plane as shown in 2A, and on a plane to be measured as shown in 2B.
Figure 2B:
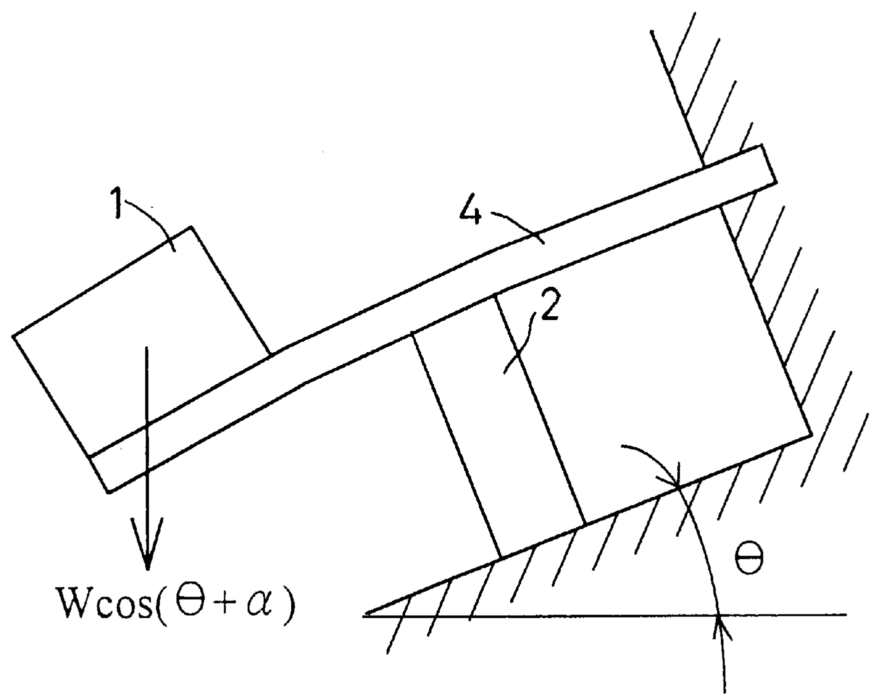

The use of a cantilever can solve the second problem. As shown in FIG. 2A, a cantilever 4 has a fixed end and a free end. A weight 1 is disposed on the free end of the cantilever 4. A piezoelectric body or a piezoelectric resonator 2 is attached at a place between the fixed end and the free end of the cantilever 4. The difference in the amount of the surface charges of the piezoelectric body/in the amplitudes of the output signal of the piezoelectric resonator between a reference plane (FIG. 2A) and an inclined plane (FIG. 2B) can be transformed into the difference of the component forces of the applied gravity acted on the resonator. The amount of the induced charges or the amplitude of the output signal is first measured by placing the inclinometer on a horizontal plane perpendicular to the gravity. The angle $\alpha$ between the direction of the vibration and the gravity is thus obtained. The angle $\alpha$ also is the deflection angle of the cantilever 4 supported by the resonator and clamped at one end. The angle is increased to $\theta+\alpha$ as the unit placed on an inclined plane. The angular difference is the inclined angle $\theta$. By dynamic measurement using a piezoelectric resonator, the resonator is not required to be supported by the ground.

Figure 3A:
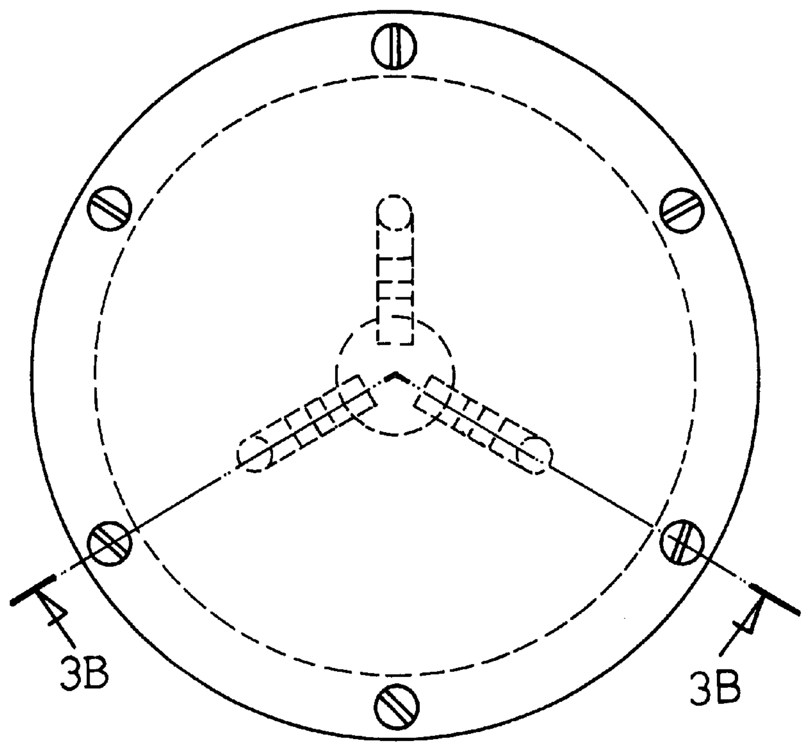
FIG. 3A is a top view of an inclinometer according to one preferred embodiment of the invention.
Figure 3B:
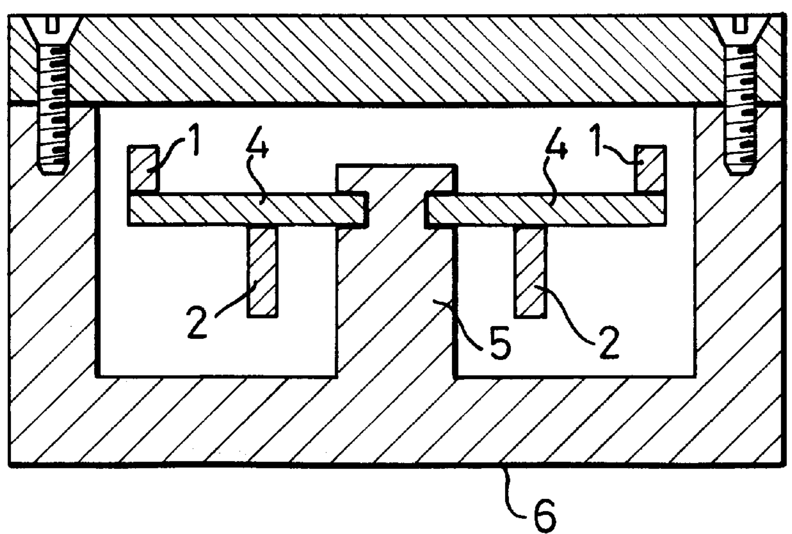
FIG. 3B is a cross-sectional view along 3B—3B of the FIG. 3A.

A multiaxial inclinometer having three cantilever arms located 120° apart from each other is disclosed in FIGS. 3A and 3B. Each arm has a fixed end fixing at the central pivot 5 and a free end having a weight 1 on it. A piezoelectric resonator 2 is attached at a place between the fixed end and the free end of each arm. The plane defined by the three arms is perpendicular to the direction of the vibration of the attached piezoelectric resonators, and parallel to the bottom plane of the multiaxial inclinometer 6, i.e., parallel to the plane to be measured. Three angles along each cantilever are transformed to the inclined angle of the plane to be measured with respect to an orthogonal coordinate. Thus, a multiaxial measurement can be achieved.

Figure 4:
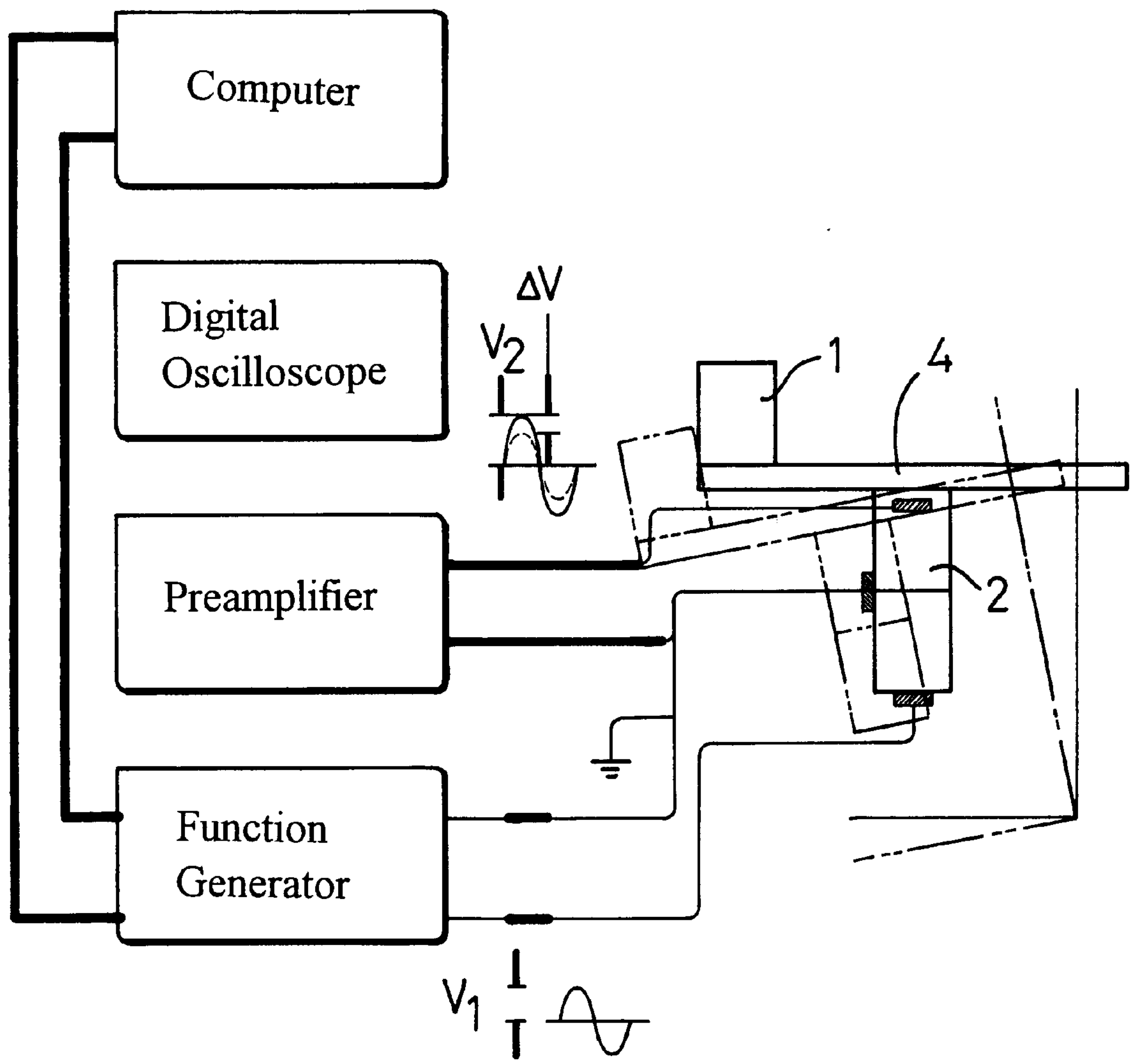
FIG. 4 is a schematic view of a measurement arrangement according to one embodiment of the invention.
Figure 5:
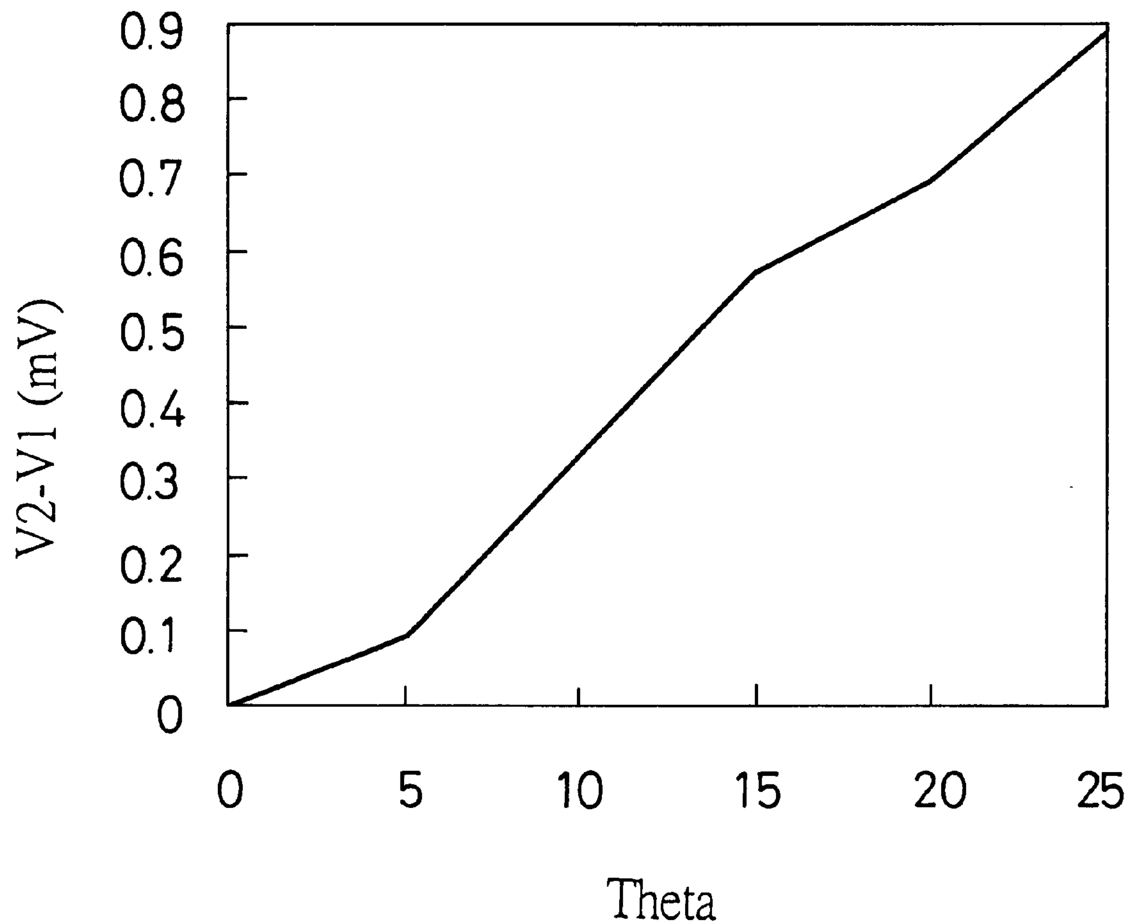
FIG. 5 shows a relation between differential amplitudes V2−V1 and inclined angles θ, wherein V1 and V2 are the amplitudes of input and output signals of a piezoelectric means.

The invention can be implemented as shown in FIG. 4. A piezoelectric plate is acturated to resonate by an input signal V1 via a function generator. An output signal V2 is obtained, then this signal is transferred to a preamplifier and displayed in a digital oscilloscope. The relation of the amplitude difference V2−V1 versus inclined angle $\theta$ is described by a calibration curve. FIG. 5 shows a typical experimental calibration curve. Any measured amplitude can be compared with the calibration curve via a computer. It is understood that the arrangement in FIG. 4 can be easily integrated in a compact unit by the microelectronic technique, and the calibration curve obtained can be stored as IC for practical application.

What is claimed is:

1. A sensor for inclination measurement, comprising:

a cantilever having a fixed end and a free end;

a mass part disposed substantially at the free end of the cantilever; and a piezoelectric resonator attached to the cantilever at a place between the fixed end and the free end, wherein the piezoelectric resonator has a first part being polarized transversely and a second part being polarized longitudinally, and the first part is coupled electromechanically to the second part.

2. A sensor for inclination measurement as claimed in claim 1, wherein the piezoelectric resonator has a longitudinal axis and a longitudinal vibration perpendicular to the cantilever.

3. A sensor for inclination measurement as claimed in claim 2, wherein the vibration of the piezoelectric resonator is excited by an input signal at the first part through an external driving circuit.

4. A sensor for inclination measurement as claimed in claim 2, wherein an amplitude of an output signal of the second part of the piezoelectric resonator is measured electronically.

5. A sensor for inclination measurement as claimed in claim 2, wherein the vibration of the piezoelectric resonator is excited by an input signal of the first part through an external driving circuit, and an amplitude of an output signal of the second part of the piezoelectric resonator is measured electronically.

6. An apparatus for multi-axial inclination measurement, comprising a plurality of the sensors as claimed in claim 5.

* * * * *